Patented Nov. 6, 1951

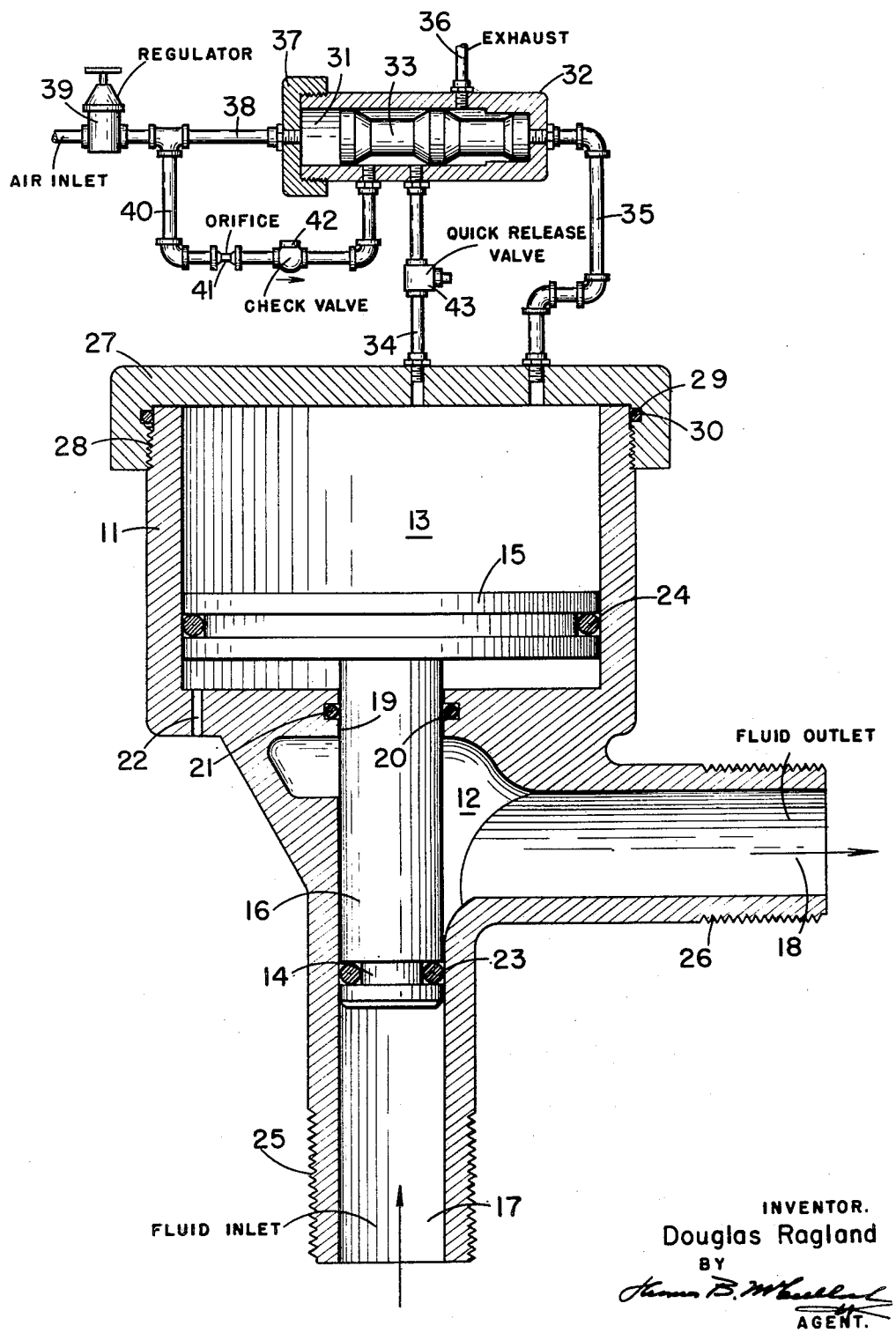

2,574,414

UNITED STATES PATENT OFFICE 2,574,414

RELIEF VALVE

Douglas Ragland, Houston, Tex., assignor, by mesne assignments, to Standard Oil Development Company, Elizabeth, N. J., a corporation of Delaware Application August 29, 1949, Serial No. 112,860

5 Claims. (Cl. 137—53)

The present invention is directed to a relief valve. More particularly, the invention is directed to an automatic pressure relief valve which is adapted to be used on power pumps. In its more specific aspects the invention is directed to a rapidly acting release valve for releasing pressure.

In the old industry it is often necessary to release fluids which are maintained under pressure. For example, in power driven slush pumps employing muds in oil well drilling operations under high pressure, it is frequently necessary to release the mud which is under high pressure and return it to the mud pit. Apparatus to conduct such operations frequently does not operate as readily as necessary and may result in the mud fluid being directed into the hole when it should be returned to the mud pits.

It is therefore the main object of the present invention to provide a quick acting pressure relief valve adapted to be employed on mud pumps.

Another object of the present invention is to provide an air controlled pressure relief valve designed to release pressure immediately.

A still further object of the invention is to provide a quick acting release valve which may be set to operate at a predetermined pressure.

The prinicpal parts of the apparatus of the present invention comprise a first housing defining first and second chambers in which first and second pistons are arranged which are adapted to move slidably in their respective chambers on corresponding movement of one of the pistons. Fluidly connected to the second of said chambers is a third chamber defined by a second housing in which a third piston is arranged for slidable movement therein. One end of the third chamber fluidly communicates with the second chamber and the second chamber fluidly communicates with said third chamber at an intermediate point thereof. The third chamber is provided with a conduit defining a passageway allowing same to exhaust to the atmosphere, while a second end of said third chamber is in fluid communication with a source of air pressure or other gaseous medium under pressure through a conduit which defines a passageway communicating with said second end. The conduit communicating with the source under pressure is provided with a by-pass conduit in which there is an orifice of restricted diameter and a check valve.

The apparatus of the present invention is adapted to be connected to the pump discharge of a pump handling fluid under high pressure such as a mud pump used in oil well drilling operations.

The invention will be better understood by reference to the drawing in which the single figure is a cross sectional view of a preferred embodiment thereof. Referring now to the drawing, numeral 11 designates a housing defining a first chamber 12 and a second chamber 13 in which pistons 14 and 15 respectively are arranged. Piston 14 and piston 15 are connected by a longitudinal member such as a rod 16. It will be seen that housing 11 defines an inlet 17 and an outlet 18. Inlet 17 may be connected to the pump discharge and outlet 18 may be connected to a conduit whereby the fluid flowing through inlet 14 may be discharged. Housing 11 defines a passageway 19 through which the rod or longitudinal member 16 makes a slidable fit. Leakage of the fluid from chamber 12 to chamber 13 and vice versa is prevented by a packing member such as an O-ring 20 arranged in a recess 21 defined by housing 11. Housing 11 further defines a vent 22 which allows release of fluid such as air which may be trapped below piston 15.

Pistons 14 and 15 are provided with conventional piston rings 23 and 24 while inlets 17 and 18 define with their outer surface threads 25 and 26 whereby connections may be made with similar internal threaded connections on conduits which may be attached thereto.

Chamber 13 is enclosed with a cover 27 which may be screwed on housing 11 by means of screw threads 28. A tight fit is insured by a packing means such as O-ring 29 which is arranged in recess 30 defined by cover 27.

Chamber 13 is in fluid communication with a second chamber 31 defined by a second housing 32 in which is arranged a piston member or air valve spool 33. Chamber 13 communicates with chamber 31 through a first conduit 34 at an intermediate point thereof and by means of a second conduit 35 at a first end thereof. At a second intermediate point thereof a third conduit 36 defines a passageway to exhaust chamber 31 to the atmosphere. It will be noted that chamber 31 is closed at a second end by a cover housing 37 leading into which is a fourth conduit 38 in which is arranged an air regulating valve 39. Conduit 38 communicates with a source of air or other fluid pressure not shown. A by-pass conduit 40 which may be designated as a fifth conduit branches from the fourth conduit at a point intermediate to regulator valve 39 and the second end of chamber 31 and leads therefrom to a point intermediate the first conduit and the second end of chamber 31. The fifth conduit 40 is provided with a restriction orifice 41 and a check valve 42. The first conduit 34 is provided with a quick release valve 43 of a type available on the market.

It will be noted that housing 32 defines with its inner surface a chamber having a diameter greater at one end than the diameter at the other end. For example, at the first end into which conduit 35 leads the diameter of chamber 31 is less than that at the second end into which conduit 38 leads. Furthermore, it will be seen that the greater portion of the chamber 31 has a larger diameter than the diameter at the first end. Thus, approximately three-fourths of the length of the chamber 31 has a larger diameter than the diameter of the other one-fourth at the first end. Similarly, the third piston or air valve spool 33 has a greater diameter for its major length than the diameter at the end corresponding to the first end of the chamber 31. In short, over three-fourths of the length of the air valve spool or piston 33 has a diameter greater than the other one-fourth of its length. The purpose of this difference in diameters will be more fully explained hereinafter.

The apparatus of the present invention in the embodiment shown in the single figure of the drawing shows the valve mechanism in the closed position; the piston 14 has blocked the inlet passage 17 and fluid cannot flow in the direction indicated by the arrows. In order to obtain quick pressure release the air valve or regulator 39 is set to deliver air pressure to the chamber 13 to exert a force greater than that required to balance the pressure applied to the piston 14 by the pump discharge pressure to which inlet 17 is connected. Thus, if the pressure exerted on the piston 14 becomes greater than that exerted on piston 15, the piston 14 and the piston 15, by virtue of being connected by rod 16, will move upwardly compressing the air in chamber 13. The high pressure air will then be exerted on the right hand end of the valve spool 33 through conduit 35 moving it to the left and exhausting air from chamber 31 and thus from the portion of conduit 34 ahead of valve 43. Lowering the pressure in conduit 34 ahead of valve 43 allows the quick release valve 43 to exhaust the air from the chamber 13. Lowering the pressure in conduit 34 opens the quick release valve to exhaust the air from cylinder 13 as described and allows the pistons 15 and 14 to move up opening the by-pass valve. As soon as the pressure applied through conduit 35 becomes less than that of conduit 38 the valve spool or valve 33 will again move to the right allowing air to be delivered through the regulator 39 to chamber 31 and thence to chamber 13 to actuate piston 15 and, through rod 16, piston 14 which closes the relief valve.

It is desirable that the right hand end of the piston or air valve spool 33 have a diameter slightly less than that of the other end to assure that the spool will be in this position when the by-pass valve is closed. It will be necessary also to have the inner surface of the housing 32 defining chamber 31 have a surface corresponding to that of the piston 33.

It will be apparent that the pump relief pressure may be changed by resetting the air regulator 39 at a different point.

While the invention has been described and illustrated by reference to mud or slush pumps, the valve or device is adaptable to many other installations where quick release of pressure is necessary. Changes in the size, shape, and location of the various structural parts of my invention will come within the purview of the skilled workman.

The nature and objects of the present invention having been fully described and illustrated, what I wish to claim as new and useful and to secure by Letters Patent is:

1. A valve adapted to release pressure rapidly which comprises, in combination, a first housing defining a first and second chamber and an inlet to and outlet from said first chamber, a first piston slidably arranged in said first chamber adapted to close said inlet, a second piston slidably arranged in said second chamber, a longitudinal member connecting said second piston with said first piston and adapted to cause corresponding movement of the latter on movement of the former, a second housing defining a third chamber, a third piston slidably arranged in said third chamber, a first conduit defining a passageway communicating said second chamber at a point ahead of said second piston with said third chamber at an intermediate point thereof, a quick release valve arranged in said first conduit adapted to release pressure from said second chamber, a second conduit defining a second passageway communicating said second chamber with said third chamber at a first end thereof adapted to actuate said third piston to release pressure from a portion of said first conduit ahead of said quick relief valve and to actuate same, a third conduit defining a third passageway communicating said third chamber with the atmosphere adapted to release pressure from the portion of said first conduit ahead of said quick release valve, a fourth conduit defining a passageway adapted to connect said third chamber with a constant source of pressure at a second end thereof whereby said first piston may be actuated when the pressure in the second conduit becomes less than that in said fourth conduit, a fifth conduit defining a fifth passageway communicating said fourth conduit with said third chamber at a point intermediate said first conduit and said second end and with said second chamber when the pressure in the second chamber becomes less than that in said fourth conduit, and a check valve arranged in said fifth conduit.

2. A valve in accordance with claim 1 in which the third chamber adjacent the first end thereof has a diameter less than the diameter adjacent the second end and said third piston at the end corresponding to the first end of said third chamber has a diameter less than that of the diameter of the end of said third piston corresponding to the second end of said third chamber.

3. A valve in accordance with claim 1 in which said fifth conduit defines an area of flow less than the individual areas of flow of said other conduits.

4. A valve adapted to release pressure rapidly which comprises, in combination, a first housing defining a first and second chamber and an inlet to and outlet from said first chamber, a first piston slidably arranged in said first chamber adapted to close said inlet, a second piston slidably arranged in said second chamber, a longitudinal member connecting said second piston with said first piston and adapted to cause corresponding movement of the latter on movement of the former, a second housing defining with its inner surface a third chamber having a diameter greater at one end than at the other, a third piston slidably arranged in said third chamber whose outer surface corresponds in diameter with the inner diameters of said third chamber, a first conduit defining a passageway communicating said second chamber at a point ahead of said second piston with said third chamber at an intermediate point thereof, a quick release valve arranged in said first conduit adapted to release pressure from said second chamber, a second conduit defining a second passageway communicating said second chamber with said third chamber at a first end thereof adapted to actuate said third piston to release pressure from a portion of said first conduit ahead of said quick release valve and to actuate same, a third conduit defining a third passageway communicating said third chamber with the atmosphere adapted to release pressure from the portion of said first conduit ahead of said quick release valve, a fourth conduit defining a passageway adapted to connect said third chamber with a source of pressure at a second end thereof whereby said third piston may be actuated when the pressure in said second conduit becomes less than that in said fourth conduit, pressure regulating means arranged in said fourth conduit, a fifth conduit defining a fifth passageway connecting to said fourth conduit at a point intermediate said pressure regulating means and said second end and communicating with said third chamber at a point intermediate said first conduit and said second end and with said second chamber when the pressure in the second chamber becomes less than that in the said fourth conduit, and a check valve arranged in said fifth conduit.

5. A valve in accordance with claim 4 in which said fifth conduit defines an area of flow less than the individual areas of flow of said other conduits.

DOUGLAS RAGLAND.

No references cited.